(12) United States Patent
Lynch et al.

(10) Patent No.: US 6,555,967 B2
(45) Date of Patent: Apr. 29, 2003

(54) LOW NOISE METHOD AND APPARATUS FOR DRIVING ELECTROLUMINESCENT PANELS

(75) Inventors: Scott Lynch, Half Moon Bay, CA (US); Jimes Lei, Milpitas, CA (US); Roshanak Aflatouni, Los Gatos, CA (US)

(73) Assignee: Supertex, Inc., Sunnyvale, CA (US)

( * ) Notice: Subject to any disclaimer, the term of this patent is extended or adjusted under 35 U.S.C. 154(b) by 0 days.

(21) Appl. No.: 09/955,255

(22) Filed: Sep. 19, 2001

(65) Prior Publication Data

US 2003/0052615 A1 Mar. 20, 2003

(51) Int. Cl.$^7$ .................................................. G09G 3/10
(52) U.S. Cl. ................................. 315/169.3; 315/169.1; 315/209 R; 345/76
(58) Field of Search ......................... 315/169.1, 169.3, 315/209 R, 307; 345/76, 77, 212, 211, 210

(56) References Cited

U.S. PATENT DOCUMENTS

| | | | |
|---|---|---|---|
| 5,686,797 A | * | 11/1997 | Sanderson ............... 315/169.3 |
| 5,789,870 A | | 8/1998 | Remson .................... 315/194.1 |
| 5,886,475 A | * | 3/1999 | Horiuchi et al. ......... 315/169.3 |
| 6,121,943 A | * | 9/2000 | Nishioka et al. .............. 345/76 |

* cited by examiner

*Primary Examiner*—Don Wong
*Assistant Examiner*—Jimmy T. Vu
*(74) Attorney, Agent, or Firm*—Jeffrey D. Moy; Andrew M. Harris; Weiss, Moy & Harris, P.C.

(57) ABSTRACT

A low noise method and apparatus for driving electroluminescent (EL) panels provides reduction in EL panel noise, and in the preferred embodiment, voltage compensation as the EL panel ages. The output of a high voltage power supply is applied to the EL panel through a circuit having an optimized time-constant, producing a waveform that reduces EL panel vibration. Additionally, if the time constant is derived in part from the capacitance of the EL panel, the time constant may be chosen such that aging of the EL panel maintains the time constant in the proper range to maintain noise reduction over the life of the panel and compensate for brightness reduction due to aging of the EL panel.

22 Claims, 4 Drawing Sheets

LOW NOISE METHOD AND APPARATUS FOR DRIVING ELECTROLUMINESCENT PANELS

BACKGROUND OF THE INVENTION

1. Field of the Invention

The present invention relates generally to electroluminescent (EL) panels, and more specifically, to a circuit for driving an EL panel to achieve low noise operation.

2. Background of the Invention

Electroluminescent (EL) panels are in common use as backlights for keyboards and displays. Recent uses of EL panels include wrist watches, cellular telephone displays and keyboards, notebook computers and personal digital assistants (PDAs). In order to produce illumination from an EL panel, an alternating high voltage power supply is required. An EL panel driver includes a high voltage power supply, and a mechanism for switching the high voltage power supply output to produce a high voltage output of alternating polarity for connection to the EL panel.

EL panels are fabricated as a laminate structure, with a phosphor-dielectric layer sandwiched between a pair of electrodes. Outer cover layers are then applied to the outer surfaces of the electrodes, producing a insulated and protected panel. When the EL panel is driven with the above-described alternating high voltage signal, vibration is produced via a piezoelectric effect between the electrodes. Since typical drive frequencies are in the audible range, the vibration is perceivable to the user of an EL panel-equipped device as audible noise.

Techniques have been adopted to reduce the EL panel noise, such as current limiting the discharge of the EL lamp and approximating a sinusoidal drive waveform, but.these techniques leave residual audible noise that may be perceived by an enduser. Additionally, the circuitry required for implementing the above-described techniques is complex and requires die area and additional power for operation.

EL panels also degrade over their lifetime due to ionic migration within the phosphor-dielectric layer. Decreasing frequency of the drive signal extends the phosphor life, but an EL panel will still become degraded and lose brightness over time. Brightness is sometimes adjustable in devices that incorporate EL panels, but a manual adjustment required by the user is less desirable than an automatic compensation for aging of the panel. The brightness of EL panels is often not adjustable, so the brightness of an EL panel in a typical installation decreases over time.

Therefore, it would be desirable to provide a apparatus and method for driving EL panels that will reduce panel noise. It would further be desirable to provide and apparatus and method for driving EL panels that will compensate for panel aging effects.

SUMMARY OF THE INVENTION

The above objective of providing a low noise apparatus and method for driving EL panels is accomplished in a circuit for driving EL panels and method for driving EL panels. The circuit includes an output for connection to the EL panel that is coupled to an output circuit for alternating an output of a high voltage power supply. The output circuit is driven by a waveform generator to provide an output alternating frequency and a waveshaping for shaping the alternating voltage at the output in a first-order exponential shape. A ratio of a full period of the waveform generator to a time constant of the exponential shape is within the range of 3 to 8.

The above objective of compensating for loss of EL panel brightness due to aging is achieved in a circuit for driving EL panels and method for driving EL panels that sets the above-described time constant in conformity with the capacitance of the EL panel, so that as capacitance of the EL panel decreases as the EL panel ages, the drive voltage supplied to the EL panel increases.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
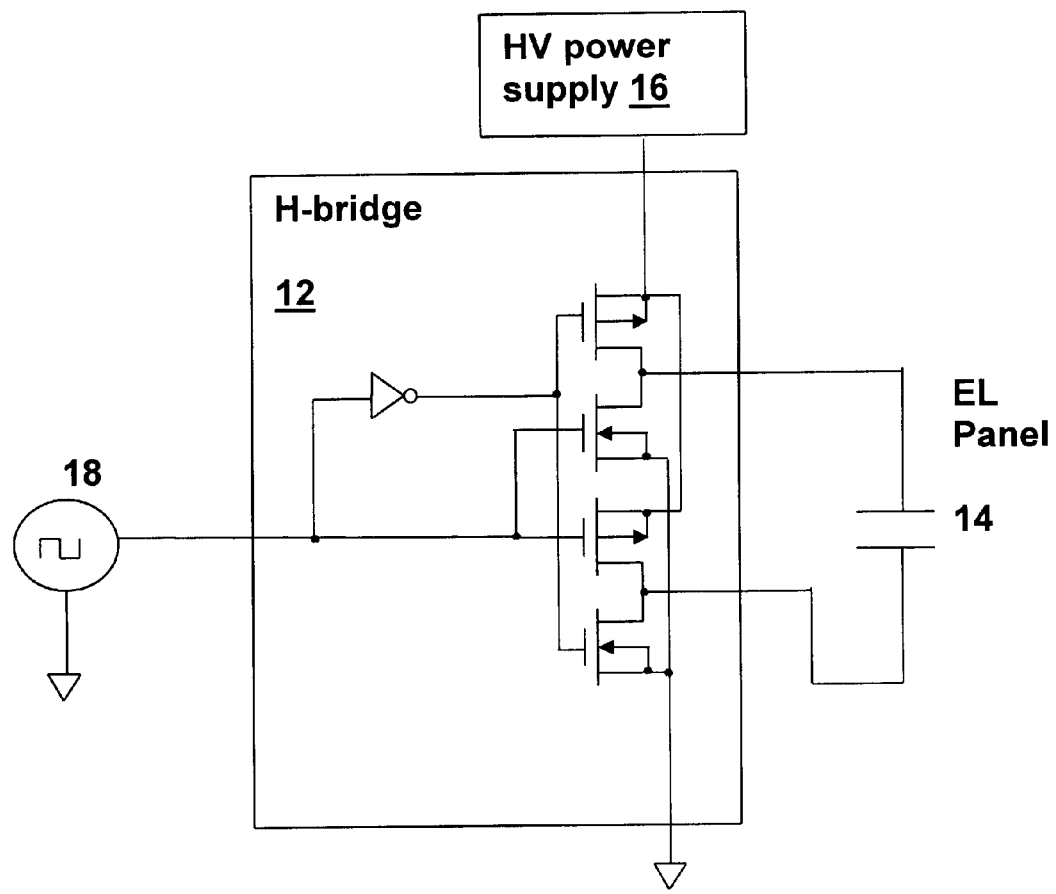
FIG. 1 is a schematic diagram depicting a prior art circuit for driving an EL panel.

Referring now to the figures and in particular to FIG. 1, a prior-art circuit for driving an electroluminescent (EL) panel is depicted. The driver circuit is coupled to an EL panel 14 and produces an alternating high voltage DC output (for example +/−200V) that causes the EL panel to luminesce. A high voltage supply 16 provides the power to operate EL panel 14. A waveform. generator 18 generates a square-wave signal to drive the H-bridge 12 output circuit that alternates the output of the high voltage power supply 16 onto the El panel 14 terminals.

The above-described circuit provides essentially a square wave drive signal to EL panel 14, with some rounding of the square-wave edges due to the parasitic resistance of the devices within H-bridge 12 and the capacitance of EL panel 14. Other driver circuit implementations within the prior art include circuits that discharge EL panel 14 prior to inverting the polarity of the output terminal signals and circuits included within the driver circuit that control the current of the discharge of EL panel 14.

When EL panel 14 is driven with the square-wave high voltage signal generated by the above-described circuits, audible noise is produced within the layers of EL panel 14, resulting in the user of devices that incorporate the EL panel hearing unnecessary sounds. Since the typical drive frequencies used with an EL panel range from approximately 50 Hz to 3 Khz, this may be perceived as a "buzz" or a high-pitched whine.

Techniques in the prior art to limit this noise as described in U.S. Pat. No. 5,789,870 include charging the EL panel with a series of narrow pulses, using the time constant of the EL panel to partially smooth the pulses, resulting in a waveshape approximating a triangular waveform. Also, discharging the EL panel through a constant current source reduces the amount of noise due to a rapid change in polarity when the output alternates. However, the above pulse and discharge techniques require additional circuitry and do not produce the ideal waveform for driving an EL panel. Also, the pulses used may contribute to EL panel noise if the frequency is within the audible range.

The present invention provides low noise EL panel operation without requiring complex circuitry that is optimized to provide a minimum amount of noise. Additionally, one embodiment of the present invention provides brightness compensation over the lifetime of the panel. As phosphors within an EL panel degrade due to ionic migration, the luminescent intensity of the panel decreases for a given drive voltage, decreasing the useable life of the EL panel. Compensation for EL panel aging extends lamp life in applications where the brightness of the lamp is not adjustable. Since the life of an EL panel is typically on the order of thousands of hours, compensation for aging is especially valuable, in that the expected useful life of the remainder of a device in which an EL panel is incorporated may be 10,000 hours or more.

Figure 2:
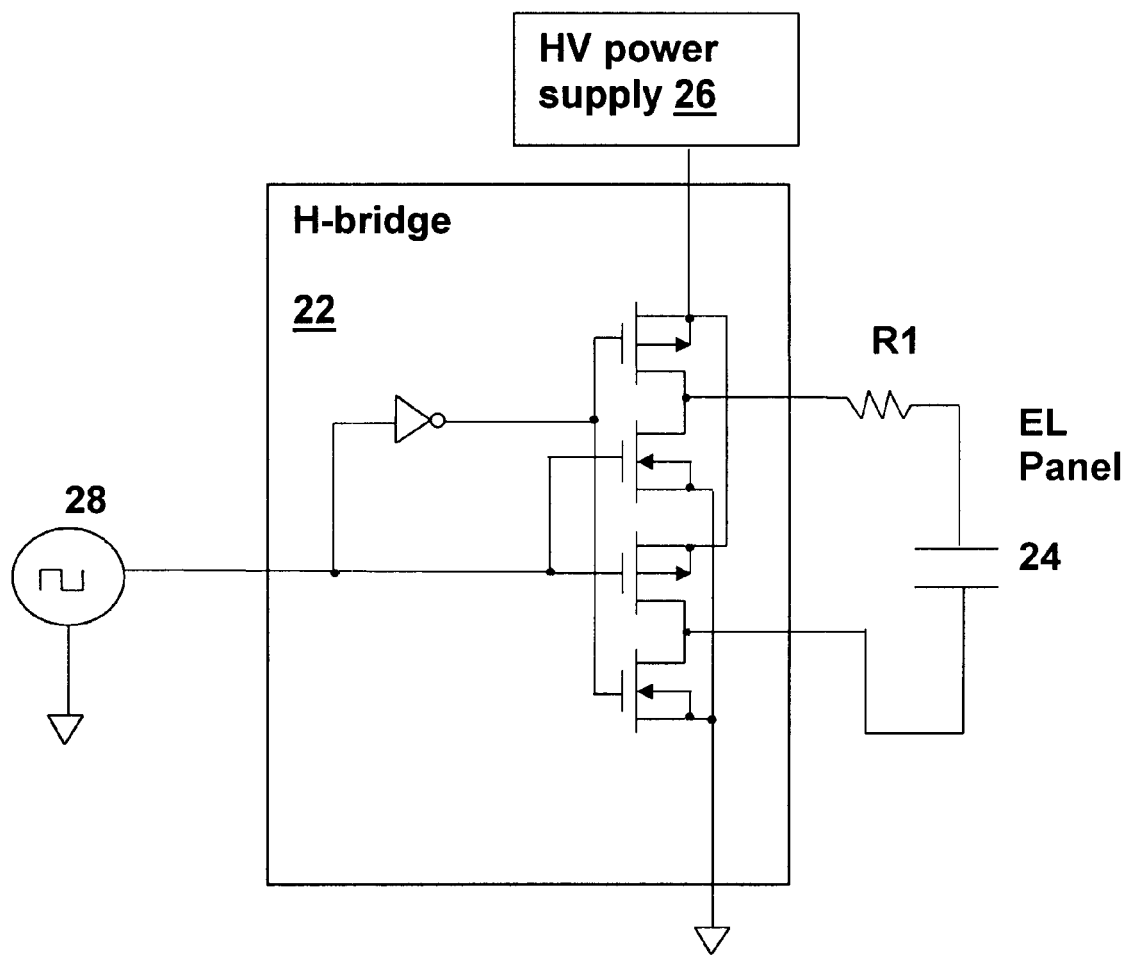
FIG. 2 is a schematic diagram depicting an EL panel driver circuit in accordance with a preferred embodiment of the invention.

Referring now to FIG. 2, an EL panel driver circuit in accordance with a preferred embodiment of the invention is depicted. The driver circuit is coupled to an EL panel 24 and produces an alternating high voltage DC output (for example +/−200V) that causes the EL panel to luminesce. A high voltage supply 26 provides the power to operate EL panel 24. A waveform generator 28 generates a square-wave signal to drive the H-bridge 22 output circuit that alternates the output of the high voltage power supply. The alternating high voltage output of the H-bridge is filtered by a first-order waveshaping circuit formed by resistor R1 and the inherent capacitance of EL panel 24. The capacitance of EL panel 24 will generally be large, as EL panels generally exhibit a capacitance in the range of 250 pf to 1000 pf per square centimeter.

The value of resistor R1 is selected by determining the time-constant desired for the waveshaping circuit. Experimental determinations have been made resulting in an optimum time constant for a given drive frequency. If the ratio of a full period of the drive waveform to the time constant of the first-order circuit is within the range of 3 to 8, noise will be minimized, with an optimum noise reduction occurring using a ratio of approximately 4.

Additionally, the range of time constants available for noise reduction can be used to advantage in compensating for EL panel aging. As the phosphor in the EL panel degrades, causing loss of brightness, the capacitance of the EL panel correspondingly decreases. By choosing a time constant that is initially higher (corresponding to setting the above-described ratio of 3), the amplitude of the alternating high voltage signal driving the EL panel is reduced. As the EL panel ages, the time constant will decrease, resulting in an increased drive voltage at the EL panel. A higher drive voltage produces a brighter luminescence from the EL panel. Thus, reduction in brightness due to aging may be compensated using the present embodiment of the invention.

Figure 3:
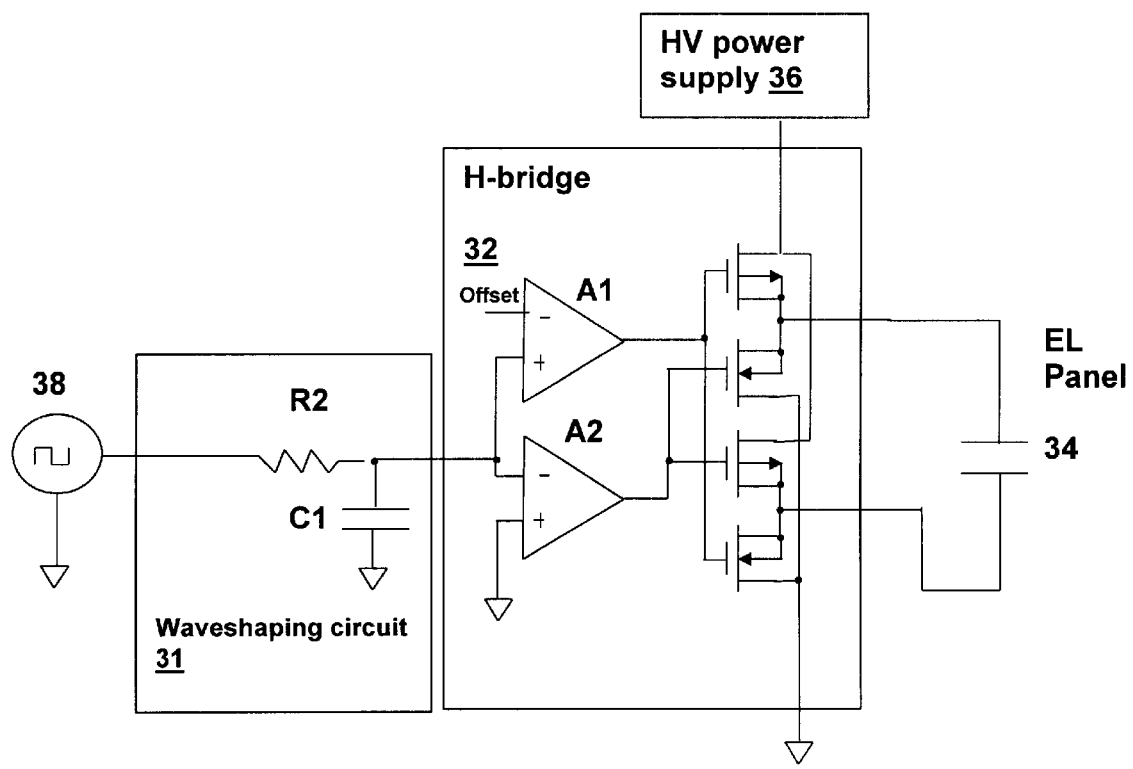
FIG. 3 is a schematic diagram depicting an EL panel driver circuit in accordance with an alternative embodiment of the invention.

Referring now to FIG. 3, an EL panel drive circuit in accordance with an alternative embodiment of the invention is depicted. The driver circuit is coupled to an EL panel 34 and produces an alternating high voltage DC output (for example +/−100V) that causes the EL panel to luminesce. A high voltage supply 36 provides the power to operate EL panel 34. A waveform generator 38 generates a square-wave signal to drive the H-bridge 32 output circuit that alternates the output of the high voltage power supply. But in contrast to the embodiment of FIG. 2, in the present embodiment the output of waveform generator 38 is shaped by a first-order waveshaping circuit 31. Waveshaping circuit 31 in the exemplary alternative embodiment comprises a resistor R2 and a capacitor C1, but alternative first-order circuits or other waveshaping circuits that approximate the desired response may be used.

By shaping the drive signal ahead of H-bridge 32, H-bridge will operate linearly during at least some portion of the drive signal waveform so that the first-order waveshape is maintained. H-bridge 32 may be designed so that only the transistors coupled to high voltage power supply 36 are operated linearly, only the transistors coupled to ground are operated linearly, or so that all transistors are operated linearly. In the illustrative embodiment, amplifier A1 provides an offset non-inverted signal to one half of H-bridge 32 and amplifier A2 provides an inverted signal to the other half of H-bridge 32, providing a split-phase drive signal to operate H-bridge as a symmetrical bridge amplifier, but other configurations within the scope of the present invention are possible.

Figure 4A:
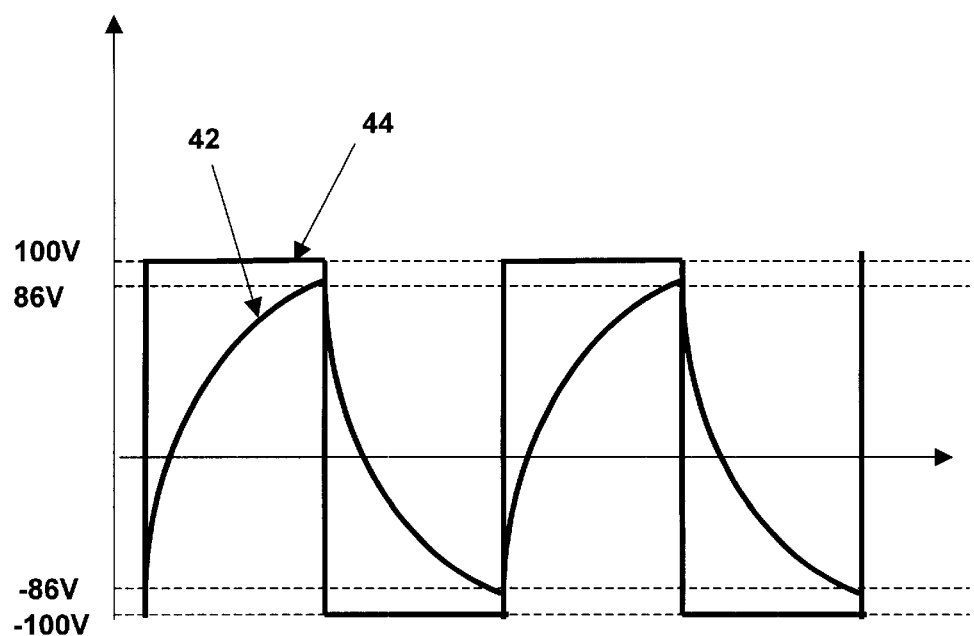
FIGS. 4A and 4B are a waveform diagrams depicting drive waveforms generated by the EL panel driver circuits of FIG. 2 and FIG. 3.

Referring now to FIG. 4A, the drive signals generated by the driver circuits of FIG. 1 and FIG. 2 are illustrated. In the illustrative example, the high voltage power supply output is set to 200V peak-to-peak, but may range from approximately 80V to 300V depending on the particular EL panel and brightness requirements of a particular device. Square wave signal 44 is a square wave signal having a full period $\tau$. Square wave signal 44 will appear at the output of H-bridge 22 of FIG. 2 but is not actually generated high voltage drive level in the embodiment of FIG. 3, as waveshaping ciruit 31 generally will operate at a lower amplitude and the high voltage signals will be controlled by the shape of the output of waveshaping circuit 31. Output drive signal 42 is depicted as the optimum shaped signal, where $\tau/RC=4$. As long as $\tau/RC$ is in the range of 3 to 8, audible noise will be adequately reduced.

Figure 4B:
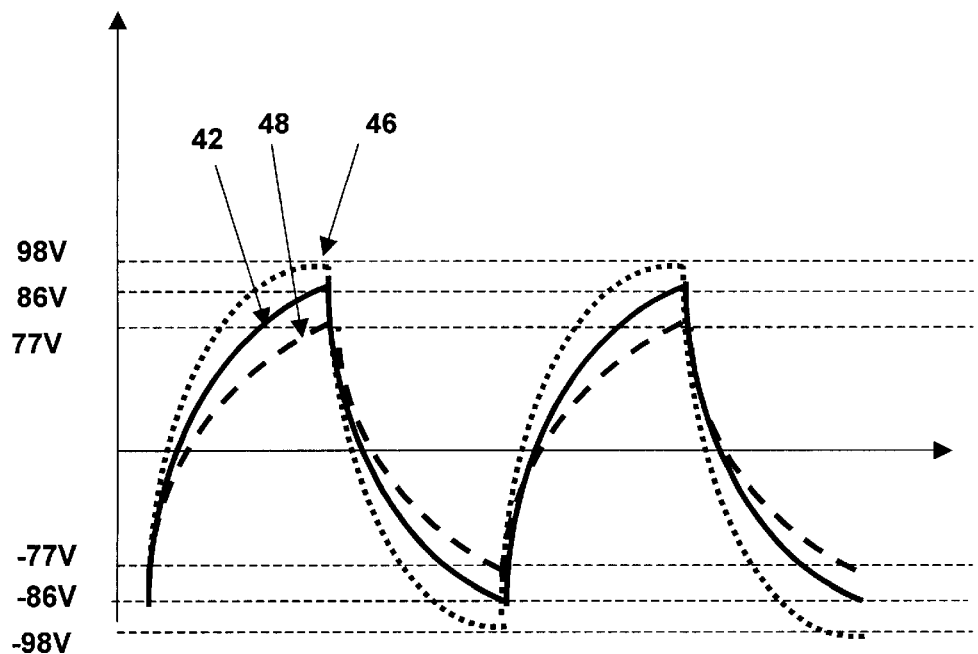

Referring now to FIG. 4B, the range of first-order waveshapes applicable to the present invention are depicted. Drive waveform 46 represents a waveshape where $\tau/RC=8$ and drive waveform 48 represents a waveshape where $\tau/RC=3$. To compensate for EL panel aging, the output of a drive circuit in accordance with the preferred embodiment of the present invention may be initially set to produce a waveform in accordance with drive waveform 48. In embodiments wherein the capacitance is provided by the EL panel inherent capacitance, as the EL panel ages, the resulting reduction in capacitance will first yield a waveform in accordance with drive waveform 42 (the optimum noise reduction waveform). As the panel ages further, the further reduction in capacitance may yield a waveform in accordance with drive waveform 46. Since the amplitude of waveforms 48, 42 and 46 are increasing in order, at least partial compensation of the loss of brightness due to EL panel aging may be achieved, while maintaining low noise operation.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A circuit for supplying a drive voltage to an electroluminescent (EL) panel, comprising:
    an output for connection to said EL panel;
    a high voltage power supply connection;
    an output circuit coupled to said output and further coupled to said high voltage power supply connection for alternating a voltage of said high voltage power supply connection at said output;
    a waveform generator connection coupled to said output circuit for providing a drive waveform for alternating said output; and a waveshaping circuit coupled to said output circuit for shaping a voltage at said output in a first-order exponential shape, wherein a ratio of a full period of said drive waveform to a time constant of said exponential shape is within the range of 3 to 8.

2. The circuit of claim 1, wherein said ratio is substantially equal to 4.

3. The circuit of claim 1, wherein said waveshaping circuit comprises a resistor coupled between said output circuit and said output, and wherein said time constant is produced as a product of a resistance of said resistor and a capacitance of said EL panel.

4. The circuit of claim 3, wherein said ratio is substantially equal to 4.

5. The circuit of claim 3, wherein said ratio is set to a value higher than 4, whereby a reduction in capacitance of said EL panel due to aging causes an increase in voltage at said output while maintaining said time constant within said range.

6. The circuit of claim 3, wherein said output circuit is a switching circuit comprising a full bridge.

7. The circuit of claim 1, wherein said waveshaping circuit comprises a first-order waveshaping circuit coupled between said waveform generator and an input of said output circuit, and wherein at least part of said output circuit is operated linearly thereby.

8. The circuit of claim 7, wherein said ratio is substantially equal to 4.

9. The circuit of claim 7, wherein said waveshaping circuit comprises:
   a resistor having a first terminal coupled to an output of said waveform generator; and
   a capacitor having a first terminal coupled to a second terminal of said resistor and a second terminal coupled to an AC ground, wherein said capacitor first terminal is further coupled to an input of said output circuit.

10. The circuit of claim 9, further comprising a buffer, and wherein said capacitor first terminal is coupled to an input of said buffer, and an output of said buffer is coupled to said input of said output circuit.

11. The circuit of claim 7, wherein said output circuit is a full bridge having positive and negative switching devices, and wherein one of said positive and negative switching devices is operated linearly in accordance with an output of said waveshaping circuit.

12. The circuit of claim 7, wherein said output circuit is a full bridge having positive and negative switching devices, and wherein both of said positive and negative switching devices are operated linearly in accordance with an output of said waveshaping circuit.

13. A circuit for supplying a drive voltage to an electroluminescent (EL) panel, comprising:
   an output for connection to said EL panel;
   a high voltage power supply connection;
   an output circuit coupled to said output and further coupled to said high voltage power supply connection for alternating a voltage of said high voltage power supply connection at said output;
   a waveform generator connection coupled to said output circuit for providing a drive waveform for alternating said output; and
   means for increasing a voltage at said output in conformity with aging of said EL panel wherein said means increases said voltage in conformity with a reduction of a capacitance of said EL panel.

14. A circuit for supplying a drive voltage to an electroluminescent (EL) panel, comprising:
   an output for connection to said EL panel;
   a high voltage power supply connection;
   an output circuit coupled to said output and further coupled to said high voltage power supply connection for alternating a voltage of said high voltage power supply connection at said output;
   a waveform generator connection coupled to said output circuit for providing a drive waveform for alternating said output; and
   a voltage-reducing circuit coupled to said output circuit for reducing a voltage at said output in conformity with a capacitance of said EL panel, whereby a reduction in capacitance of said EL panel due to aging of said EL panel causes an increase in voltage at said output, whereby a loss of brightness of said EL panel due to aging of said EL panel is reduced or eliminated.

15. The circuit of claim 14, wherein said voltage-reducing circuit is a resistor coupled between said output and said output circuit.

16. A method for driving an electroluminescent (EL) panel, comprising:
   alternating a supply voltage at a repetitive period to produce an alternating high voltage;
   shaping said alternating supply voltage to produce a first-order exponential shape, wherein a ratio of said period to a time constant of said exponential shape is within the range of 3 to 8; and
   supplying a resulting shaped alternating high voltage to said EL panel, whereby audible noise from said EL panel is reduced by said shaping.

17. The method of claim 16, further comprising generating a first-order exponential waveform, and wherein said alternating is performed linearly in response to said generated waveform.

18. A method of claim 17, wherein said generating is performed by first generating a square wave and in response to said first generating, filtering said square wave through a first-order low pass filter.

19. The method of claim 16, wherein said shaping is performed by filtering said alternating supply voltage through a first-order low pass filter.

20. The method of claim 19, wherein said shaping is performed by supplying said alternating supply voltage through a resistive impedance, whereby a capacitance of said EL panel completes said first-order low pass filter.

21. A method for driving an electroluminescent (EL) panel, comprising:
   alternating a supply voltage at a frequency to produce an alternating high voltage;
   reducing said alternating high voltage by a predetermined reduction;
   supplying a resulting reduced alternating high voltage to said EL panel, whereby brightness of said EL panel is initially reduced; and
   subsequent to aging of said EL panel, decreasing of said EL panel.

22. The method of claim 21, wherein said reducing and said decreasing are determined by changes in a capacitance of said EL panel.

* * * * *